United States Patent [19]

Shaw et al.

[11] Patent Number: 5,729,979
[45] Date of Patent: Mar. 24, 1998

[54] VARIABLE RATE BRAKE PEDAL FEEL EMULATOR

[75] Inventors: Schuyler Scott Shaw, Dayton; John Benjamin Hageman, Vandalia, both of Ohio

[73] Assignee: General Motors Corporation, Detroit, Mich.

[21] Appl. No.: 720,167

[22] Filed: Sep. 25, 1996

[51] Int. Cl.⁶ .............................. F15B 7/00; B60T 11/20
[52] U.S. Cl. .............................................. 60/533; 60/562
[58] Field of Search .............................. 60/533, 561, 562

[56] References Cited

U.S. PATENT DOCUMENTS

| | | | |
|---|---|---|---|
| 2,166,962 | 7/1939 | Masteller | 60/561 |
| 4,078,385 | 3/1978 | Zabadneh | 60/562 X |
| 4,505,116 | 3/1985 | Weiler et al. | 60/562 |
| 5,246,283 | 9/1993 | Shaw et al. | 303/115.2 |

FOREIGN PATENT DOCUMENTS 172718  10/1952  Austria .............................. 60/533

Primary Examiner—Hoang Nguyen
Attorney, Agent, or Firm—Jeffrey A. Sedlar

[57] ABSTRACT

A brake pedal feel emulator includes a piston that is movable against the force of a compressible elastomeric body and fluid force. The emulator supplies conventional pedal feel and travel characteristics when the primary and secondary pistons of the brake system's master cylinder are substantially movable due to isolation of the master cylinder from the wheel brakes. The fluid force is supplied by controlling the flow of fluid from behind the emulator piston through a flow restrictive orifice to a conventional fluid reservoir on the master cylinder assembly. The emulator is operable with electric or electro-hydraulically controlled braking system.

14 Claims, 2 Drawing Sheets

1

VARIABLE RATE BRAKE PEDAL FEEL EMULATOR

TECHNICAL FIELD

The present invention relates to a variable rate brake pedal feel emulator and more particularly, to a variable rate brake pedal feel emulator that closely matches the performance feel of a conventional vacuum or hydraulic boosted brake apply system.

BACKGROUND OF THE INVENTION

With a brake-by-wire, or similar type of vehicle braking system, wherein the application of fluid brake pressure to the wheel brakes is generated by an electric or an electro-hydraulic controlled means rather than by the manual application of force to the master cylinder, the master cylinder is typically isolated from the rest of the braking system during brake operation. This changes the response characteristics at the vehicle's brake pedal from those conventionally provided and prevents the driver from experiencing the customary brake pedal travel and feel.

It is preferable that the vehicle driver experience a more conventional pedal response when applying a vehicle's brakes on a vehicle with electric or electro-hydraulic brake control. In some applications, such a control system is preferably "transparent" to the driver as compared to a conventionally boosted apply system. Accordingly, brake by wire systems include ancillary components to approximate conventional pedal characteristics during brake application. These ancillary components increase costs, require additional space and interject discernible differences into the pedal feel characteristic during brake application cycles.

A known device that mimics the conventional pedal feel when the master cylinder is isolated from the remainder of the braking system includes a stand alone accumulator with movable pistons separated by a pair of springs. The pistons move against the springs to provide compliance in the system providing pedal feel and travel rather than a hard pedal. It has been found that this type of system provides a pedal feel that is discernably different than a conventionally boosted manual apply system.

Additional efforts have been made that are directed at more closely approximating conventional brake apply feel at the pedal. The use of additional springs, providing gaps adjacent springs or integrating the device into a master cylinder have been found to help in this regard. However, springs continue to interject discernible transition points into the feel experienced by the vehicle operator at the brake pedal.

SUMMARY OF THE INVENTION

The present invention provides a variable rate pedal feel emulator that supplies the typical brake pedal travel and feel characteristics to a brake system when the master cylinder is isolated from the wheel brakes.

A preferred embodiment of the invention provides a pedal feel emulator assembly positioned between the primary piston of the master cylinder and the brake pedal push rod. However, the pedal feel device may be remotely located. The emulator assembly utilizes a dual piston unit and cooperates with operation of the master cylinder. The dual piston unit is movable against the force of a compliant element and fluid forces upon the application of manual pressure to the brake pedal, even when the primary piston is substantially immovable due to isolation of the master cylinder from the remainder of the braking system.

A brake master cylinder and emulator assembly according to this preferred embodiment includes a body having a stepped longitudinal bore and at least one transverse bore. A fluid reservoir is carried near the body and communicates with the transverse bore. A compensation port extends through the body between the transverse bore and the longitudinal bore providing a means of communicating fluid between the master cylinder and the reservoir.

A primary piston unit is slidably carried in the stepped longitudinal bore of the master cylinder and emulator. The primary piston unit separates the stepped longitudinal bore into, at least, a high pressure chamber that communicates with the brake system and a variable chamber. A specifically tuned flow restrictive orifice is provided between the variable chamber and the reservoir.

An emulator piston is slidably carried in the stepped longitudinal bore on the variable chamber side of the primary piston unit. The primary piston unit preferably forms a cavity defining the variable chamber in cooperation with the emulator piston, which together serve as the dual piston unit. The emulator piston is movable between an at-rest position and a range of apply positions while the primary piston unit remains substantially unmoved and is also effective in transmitting movement to the primary piston unit when the brake system is operable in a manual apply mode. The compliant element extends between the primary piston unit and the emulator piston.

According to a preferred aspect of the present invention, when the emulator piston is moved from the at-rest position, fluid in the variable chamber between the primary piston unit and the emulator piston is forced through at least one orifice in the primary piston unit or emulator piston and is communicated to the braking system through the compensation port. The compensation port of the transverse bore communicates with the stepped longitudinal bore at the side of the primary piston unit.

In operation, when force is applied to the braking pedal of a vehicle incorporating the present invention and the master cylinder is isolated from the remainder of the hydraulic braking system, the push rod applies the pedal force to the emulator piston which is movable against the compliant element and fluid forces providing the customary brake pedal travel and feel. This occurs while the primary piston remains substantially immovable due to the non-compressibility of the braking fluid trapped in the master cylinder's high pressure chambers.

According to a preferred embodiment of the present invention, the compliant element force is provided by an elastomeric body. The elastomeric body is shaped to resist movement of the emulator piston upon application of pedal force with a smooth and an initial relatively gradually increasing rate. When additional movement of the pedal and emulator piston has occurred, the elastomeric body provides a smooth transition to exhibiting a significantly greater rate of increasing force for a given amount of travel.

Additional resistance to movement of the emulator piston is provided by fluid force created by the flow restrictive orifice(s) in the assembly. Each flow restrictive orifice meters the flow of fluid out from a compliant chamber, as fluid flows from the compliant chamber into the reservoir of the master cylinder assembly. The amount of restriction provided by the flow restrictive orifice is designed according to the application and the selected pedal travel and feel characteristics desired for the system.

The system is designed so that when the master cylinder is not isolated from the remainder of the associated braking system travel of the emulator piston effects movement of the primary piston. This ensures that the master cylinder can be utilized to provide a pressure source for braking application in a conventional manual apply manner when desired or needed. In such operation, the master cylinder's pistons are manually moved to pressurize the braking system through the high pressure chambers.

During a manual apply mode the present invention provides a mechanical/hydraulic means of shutting off or by-passing the emulator. This occurs when preferred isolating solenoid valves open, permitting the primary and secondary pistons to move to generate braking pressure. The otherwise additional travel of the emulator is not added to pedal travel during manual mode operation.

DESCRIPTION OF THE PREFERRED EMBODIMENT

Figure 1:
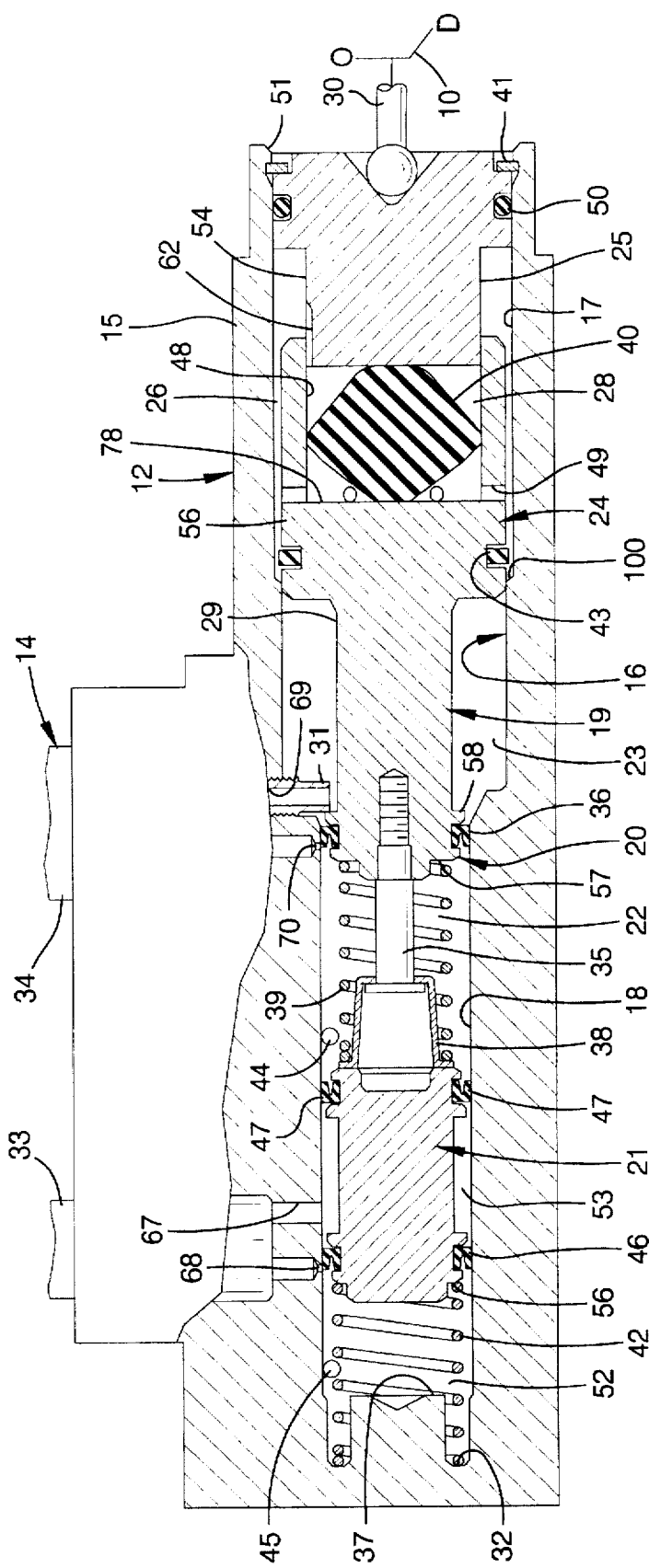
FIG. 1 is a fragmentary cross sectional view of a brake system's master cylinder and emulator assembly.

Referring to the drawings, illustrated in FIG. 1 is a brake system's master cylinder and emulator assembly in accordance with the present invention designated in the aggregate as 12. The master cylinder and emulator assembly 12 includes a body 15 formed of an acceptably rigid material such as metal or plastic and an associating fluid reservoir 14. The master cylinder and emulator assembly 12 is responsive to the manual application of force to a brake pedal 10, through the push rod 30.

A stepped longitudinal bore 16 extends through body 15 and slidably carries a plural piston arrangement including primary piston unit 19, secondary master cylinder piston 21 and emulator piston 25. The primary piston unit 19 is arranged in a subassembly that includes primary master cylinder piston 20 and intermediate piston 24 which, in the present embodiment are formed together as a one piece rigid body. A spring retainer 38 is slidably retained on primary master cylinder piston 20 by means of fastener 35. A return spring 39 is carried between spring retainer 38 and shoulder 57 of primary master cylinder piston 20.

The primary piston unit subassembly also includes a seal 36 carried in a circumferential groove between shoulder 57 and shoulder 58 of primary master cylinder piston 20. The seal 36 bears against the wall of stepped longitudinal bore 16 in master cylinder bore 18 and provides fluid separation between primary high pressure master cylinder chamber 22 and intermediate chamber 23.

A seal 43 is carried on intermediate piston 24 and is spaced away from the wall of stepped longitudinal bore 16 in emulator bore 17. The seal 43 effects fluid separation between intermediate chamber 23 and chamber 26 when positioned to the left of step 100 where it bears against the wall of stepped longitudinal bore 16 formed by body 15. The seal 43 provides fluid communication between intermediate chamber 23 and chamber 26 when positioned to the right of step 100 as shown. Seals 36 and 43 of primary piston unit 19 define movable boundaries of chamber 26 and primary high pressure master cylinder chamber 22 in stepped longitudinal bore 16 as detailed below.

Primary piston unit 19 includes a longitudinal bore 48 that enters into the intermediate piston 24 within chamber 26 and extends partially through the primary piston unit 19. A plurality of orifices, represented by orifice 49, extend radially through primary piston unit 19 intersecting longitudinal bore 48. The longitudinal bore 48 defines variable chamber 28 in cooperation with the emulator piston 25. Variable chamber 28 is in continuously open fluid communication with chamber 26 through the orifices 49. The primary piston unit 19 and specifically, the primary master cylinder piston 20 is operable to selectively pressurize a braking circuit (not illustrated), through outlet opening 44.

Secondary master cylinder piston 21 is substantially spool-shaped and is slidably carried in master cylinder bore 18 of stepped longitudinal bore 16 to the left of primary master cylinder piston 20 as viewed in FIG. 1. Secondary master cylinder piston 21 is engaged by spring retainer 38 of the primary piston unit subassembly. A return spring 42 extends between the shoulder 56 of secondary master cylinder piston 21 and the spring seat 32 at blind end 37 of the stepped longitudinal bore 16. The return spring 42 biases the secondary master cylinder piston 21 toward the primary master cylinder piston 20. Similarly, the return spring 39 biases the primary master cylinder piston 20 toward the emulator piston 25.

Secondary master cylinder piston 21 carries a primary seal 46 fluidly separating master cylinder bore 18 into secondary high pressure master cylinder chamber 52 and secondary low pressure master cylinder chamber 53. Secondary master cylinder piston 21 also carries a secondary seal 47 that separates secondary low pressure master cylinder chamber 53 from primary high pressure master cylinder chamber 22 within the master cylinder bore 18. The secondary master cylinder piston 21 is operable to selectively pressurize a braking circuit (not illustrated), through the outlet opening 45.

Master cylinder body 15 is adapted to receiving bayonets 33 and 34 of a conventional reservoir 14. A compensation port 67 provides an opening between reservoir 14 and master cylinder bore 18 into secondary low pressure chamber 53. A bypass hole 68 provides an opening between reservoir 14 and master cylinder bore 18 into secondary high pressure master cylinder chamber 52 when the secondary master cylinder piston 21 is in the at-rest position shown in FIG. 1. During a manual apply mode, when the secondary master cylinder piston 21 is moved to an apply position, the primary seal 46 is moved to a position to the left, (as viewed in FIG. 1), of bypass hole 68 so that the bypass hole 68 provides an opening between reservoir 14 and secondary low pressure master cylinder chamber 53.

Similarly, a compensation port 69 provides an opening between reservoir 14 and the master cylinder bore 18 of stepped longitudinal bore 16 into intermediate chamber 23. Additionally, a bypass hole 70 provides an opening between reservoir 14 and master cylinder bore 18 of stepped longitudinal bore 16 into primary high pressure master cylinder chamber 22 when the primary master cylinder piston 20 is in the at-rest position shown in FIG. 1. During a manual apply mode when the primary master cylinder piston 20 is moved to an apply position, the seal 36 is moved to a position to the left, (as viewed in FIG. 1), of bypass hole 70 so that the bypass hole 70 provides an opening between reservoir 14 and intermediate chamber 23. The compensation ports 67, 69 and the bypass holes 68, 70 provide fluid routes between the reservoir 14 and the stepped longitudinal bore 16.

The primary piston unit 19 resembles a spool and includes an annular undercut 29 formed around its circumference defining intermediate chamber 23 in cooperation with the wall of stepped longitudinal bore 16. The seal 36 operates to permit fluid compensation flow into the primary high pressure master cylinder chamber 22 from the intermediate chamber 23 when the primary master cylinder piston 20 moves back to the illustrated at-rest position from an apply position.

A stop pin 31 is threaded into the body 15 and forms the compensation port 69. The stop pin 31 engages shoulder 58 to limit travel of primary piston unit 19 to the right as viewed in FIG. 1. The primary piston unit 19 is biased toward the stop pin 31 by return springs 39 and 42.

During operation of the associating braking system, the primary high pressure master cylinder chamber 22 and the secondary high pressure master cylinder chamber 52 typically become closed off and isolated from the remainder of the braking system preventing the communication of fluid through outlet openings 44 and 45. This means that the primary piston unit 19 becomes substantially immovable due to the non-compressible fluid trapped in the chambers 22 and 52. To provide desirable feel and travel characteristics to the brake pedal, compliancy is provided in the system by means of the emulator piston 25, elastomeric body 40, orifices 49 and slots 62.

Emulator piston 25 is slidably carried in emulator bore 17 of stepped longitudinal bore 16 and is maintained therein by retaining ring 41. The emulator piston 25 carries seal 50 to maintain the fluid tight integrity of the rear opening 51 to stepped longitudinal bore 16. The emulator piston 25 also includes a post 54 which extends toward the primary piston unit 19 and is coupled therewith by extending into longitudinal bore 48. A number of fluid relief slots are formed in post 54, representative of which is slot 62. The slot 62 provides a route for fluid to move between the variable chamber 28 and the chamber 26.

The emulator piston 25 operates to provide a preselected response at the push rod 30 when actuated by brake pedal 10 during a braking event that effects hydraulic isolation of the master cylinder assembly from the vehicle's wheel brakes (not illustrated). When the master cylinder assembly is isolated from the wheel brakes, fluid in chambers 22 and 52 is unable to move through outlet openings 45 and 44. In such a case, when force is applied to the associating brake pedal 10, push rod 30 is caused to apply force to emulator piston 25 such that movement of the emulator piston 25 occurs. Fluid is forced from the variable chamber 28 through the orifices 49 and slots 62 into the chamber 26. From chamber 26, fluid is forced around the outside diameter of seal 43 and communicated into intermediate chamber 23.

The fluid is contained in intermediate chamber 23 and chamber 26 by the seal 50 and the seal 36 which is held against the wall of stepped longitudinal bore 16 by trapped fluid in primary high pressure master cylinder chamber 22. Therefore, the fluid transmission effected into intermediate chamber 23 by displacement of emulator piston 25 is directed through compensation port 69 to reservoir 14.

The emulator assembly of FIG. 1 operates to provide the selected pedal response and feel through the push rod 30 even though the master cylinder pistons 20 and 21 are immovable. Optionally, the emulator assembly may be located remotely from the master cylinder. With such a stand alone embodiment, the variable chamber 28 may optionally contain air or other gas that is relieved to the atmosphere or an accumulator.

Figure 2:
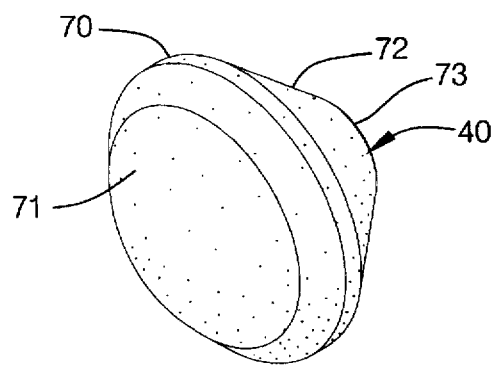
FIG. 2 is a perspective illustration of the compliant element of the assembly in FIG. 1.

The emulator assembly's elastomeric body 40, shown in FIG. 1, is illustrated in greater detail in FIG. 2. Elastomeric body 40 is a solid body of natural or synthetic rubber. It includes a circular perimeter surface 70 that bears against the wall of longitudinal bore 48 in the present embodiment, with a space optionally provided between the circular perimeter surface and the wall of longitudinal bore 48. This will accommodate expansion of the body 40 in a radial direction, which may be preferable depending upon the response required at the pedal 10, for a given application. On a first side of the perimeter surface 70 the elastomeric body 40 has a curved surface 71 that bears against the end wall 78 of longitudinal bore 48 as shown in FIG. 1. On a second side of the perimeter surface 70 the elastomeric body has a conical surface 72 with an end 73 that bears against the post 54 of emulator piston 25.

The following description relates to operation of the present embodiment with the master cylinder isolated from the associated braking system. As the brake pedal 10 is applied, the post 25 moves toward the end wall 78 of longitudinal bore 48 reducing the size of variable chamber 28. Fluid is forced from the variable chamber 48 through the orifices 49 and slots 62. The orifices 49 and slots 62 are sized to provide a selected amount of resistance to fluid flow. This provides a manner of tailoring the response of the emulator assembly.

As the variable chamber is reduced in size, the elastomeric body 40 is compressed between the post 25 and the end wall 78. The elastomeric body provides a smoothly increasing pedal travel versus pedal force characteristic. As pedal travel is initiated, pedal force increases relatively modestly for a given amount of pedal travel. After approximately 2 inches of pedal travel, the travel versus force characteristic exhibits a smooth transition to a significantly higher rate of pedal force increase for a given amount of pedal travel. This characteristic is tailored to mimic the characteristic exhibited by a system where the master cylinder is not isolated from the wheel brakes.

Figure 3:
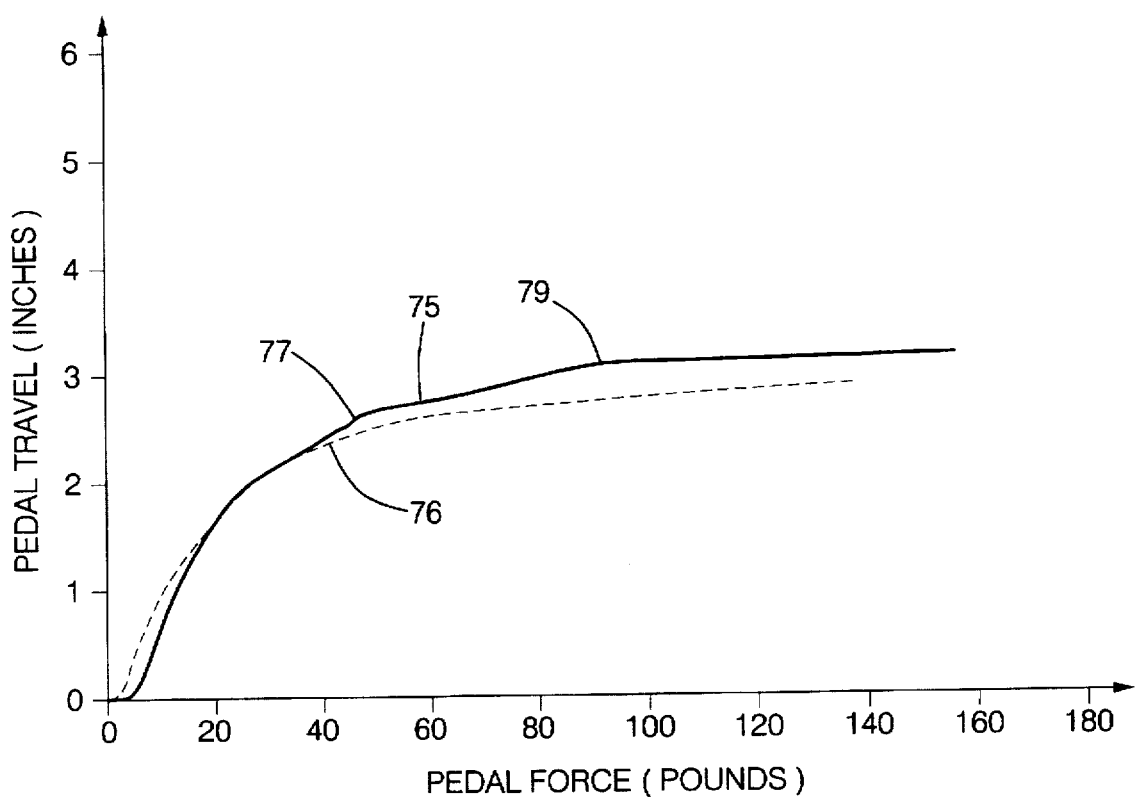
FIG. 3 is a graph of pedal travel versus pedal force for a steel spring emulator and an emulator according to the present invention.

Referring to FIG. 3, a comparison is demonstrated between a steel spring emulator at curve 75 and an emulator according to the present invention at curve 76. Curve 75 demonstrates distinct transition points 77 and 79. These transition points can be discernible at the pedal 10 and are therefore, undesirable. The curve 76 demonstrates that a more smoother curve without distinct transition points is provided by the present invention. Curve 76 also provides a preferred feel at the brake pedal 10.

After a brake application, when the manually applied force is removed from the brake pedal 10, the elastomeric body 40 forces the emulator piston 25 to return to the at-rest position illustrated, drawing fluid into the variable chamber 28 through the orifices 49 and the slots 62. The return of the emulator piston 25 is not assisted by fluid force since the fluid source is the unpressurized reservoir 14.

A means of ensuring that the master cylinder and emulator assembly 12 is operable without an excessive increase in pedal travel in the no-power assist mode is provided, to apply braking pressure by movement of the pistons 20, 21 if a sufficient amount of force is applied to the push rod 30. When the master cylinder is not isolated from the remainder of the associated braking system, fluid can exit through the outlet openings 44, 45 and the pistons 20, 21 are movable. In response to application of the brake pedal 10, the seal 43 will travel to the left of step 100 and sealingly engage the wall of bore 16. At this position, seals 43 and 50 isolate the non-compressible fluid in the chamber 26 and variable chamber 28. This forms a hydraulic lock in the variable chamber 26 and therefore, does not add additional travel to the no-power apply condition. This enables pressurization of the high pressure chambers 22 and 52 for the application of fluid pressure through the outlet openings 44 and 45 to the associating braking system. Therefore, the master cylinder and emulator 12 provides a second mode for operation of the braking system by means of a manual mechanism to actuate wheel brakes, when required or desired.

We claim:

1. A brake pedal feel emulator comprising:

a rigid body having a longitudinal bore with an end wall;

an emulator piston having a post that is slidably received within the longitudinal bore wherein a variable chamber is defined in the longitudinal bore between the rigid body and the emulator piston; and an elastomeric body positioned in the variable chamber wherein the post is slidable toward the end wall compressing the elastomeric body wherein the elastomeric body resists sliding of the post exhibiting a force versus travel characteristic that is initially increasing at a first rate and wherein the force versus travel characteristic subsequently goes through a smooth transition to a second rate that is increasing substantially faster than the first rate.

2. A brake pedal feel emulator according to claim 1 wherein the rigid body includes an orifice opening into the longitudinal bore wherein the orifice is sized to meter fluid flow out of the variable chamber when the post slides toward the end wall and wherein the orifice allows fluid into the variable chamber when the post slides away from the end wall.

3. A brake pedal emulator according to claim 2 wherein the rigid body carries a seal that shuts off the fluid flow metered out of the variable chamber by engagement between the seal and the rigid body.

4. A brake pedal feel emulator according to claim 1 wherein the post includes a slot, with the slot opening into the longitudinal bore, wherein the slot is sized to meter fluid flow out of the variable chamber when the post slides toward the end wall and wherein the slot allows fluid into the variable chamber when the post slides away from the end wall.

5. A brake pedal feel emulator according to claim 2 wherein the elastomeric body includes a perimeter surface engaging the rigid body within the longitudinal bore, a curved surface on a first side of the perimeter surface and a conical surface on a second side of the perimeter surface.

6. A brake master cylinder and brake pedal feel emulator assembly comprising:

a body having a stepped bore and having a transverse bore extending into the body;

a reservoir carried near the body and communicating with the transverse bore with a compensation port extending through the body between the transverse bore and the stepped bore;

a primary piston unit slidably carried in the stepped bore having a first side and a second side wherein a longitudinal bore is formed in the first side of the primary piston unit;

an emulator piston slidably received within the longitudinal bore wherein a variable chamber is defined between the primary piston unit and the emulator piston within the longitudinal bore, the emulator piston having a post extending into the variable chamber toward the primary piston unit, the emulator piston being movable between an at-rest position and a plurality of apply positions while the primary piston unit remains substantially unmoved wherein the variable chamber is contractible and expansible; and an elastomeric body positioned in the variable chamber wherein the elastomeric body is compressible between the emulator piston and the primary piston unit.

7. A brake pedal feel emulator according to claim 6 wherein the primary piston unit includes an orifice opening into the variable chamber wherein the orifice is sized to meter fluid flow out of the variable chamber when the post of the emulator piston slides inwardly in the variable chamber and wherein the orifice allows fluid into the variable chamber when the post slides outwardly from the variable chamber.

8. A brake pedal feel emulator according to claim 7 wherein the primary piston unit carries a seal that shuts off the fluid flow metered out of the variable chamber by engagement between the seal and the body within the stepped bore during a manual apply mode of operation.

9. A brake pedal feel emulator according to claim 6 wherein the post includes a slot, with the slot opening into the longitudinal bore wherein the slot is sized to meter fluid flow out of the variable chamber when the post of the emulator piston slides inwardly in the variable chamber and wherein the slot allows fluid into the variable chamber when the post slides outwardly from the variable chamber.

10. A brake pedal feel emulator according to claim 9 wherein the elastomeric body includes a perimeter surface engaging the rigid body within the longitudinal bore, a curved surface on a first side of the perimeter surface engaging the primary piston unit and a conical surface on a second side of the perimeter surface engaging the post.

11. A brake master cylinder and pedal feel emulator comprising:

a body having a stepped bore and having a transverse bore extending into the body;

a reservoir carried on the body and communicating with the transverse bore with a compensation port extending through the body between the transverse bore and the stepped bore;

a primary piston unit slidably carried in the stepped bore having a first side and a second side wherein a longitudinal bore is formed in the first side of the primary piston unit and a flow restrictive orifice is formed in the primary piston unit opening to the longitudinal bore;

an emulator piston slidably received within the longitudinal bore wherein a variable chamber is defined between the primary piston unit and the emulator piston within the longitudinal bore, the emulator piston having a post extending into the variable chamber toward the primary piston unit, the emulator piston being movable between an at-rest position and a plurality of apply positions while the primary piston unit remains substantially unmoved wherein the variable chamber is contractible and expansible;

a push rod engaging the emulator piston;

a brake pedal engaging the push rod; and an elastomeric body positioned in the variable chamber wherein the elastomeric body is compressible between the emulator piston and the primary piston unit upon application of a force to the brake pedal;

wherein a flow path is defined between the reservoir and the variable chamber, the flow path including the transverse bore and the compensation port with the emulator piston being movable between an at-rest position and a plurality of apply positions while the primary piston unit remains substantially unmoved wherein the variable chamber is contractible and expansible wherein the compensation port of the transverse bore communicates with the variable chamber through the flow path so that when the emulator piston is moved from the at-rest position fluid in the variable chamber is forced through the compensation port and the flow restrictive orifice to the reservoir.

12. A brake master cylinder and pedal feel emulator according to claim 11 wherein the primary piston unit carries a seal that closes off the flow path by engaging the body within the longitudinal bore during a manual apply mode wherein the primary piston unit is operable to generate a braking pressure and the variable chamber is restricted from expansion and contraction.

13. A master cylinder and brake pedal feel emulator for operation in a brake system comprising:

a body having a stepped bore and having a primary and secondary transverse bores extending into the body;

a reservoir carried on the body and communicating with the primary and secondary transverse bores with a compensation port and a bypass hole extending through the body between each transverse bore in the stepped bore;

a primary piston unit slidably carried in the stepped bore having a first side and a second side with a longitudinal bore formed in the first side;

a fastener connected to the second side of the primary piston;

a spring retainer slidably carried on the fastener;

a return spring compressibly extending between the spring retainer and the primary piston unit;

a secondary piston slidably carried in the stepped bore on the second side of the primary piston unit and engaging the spring retainer;

an emulator piston slidably carried in the stepped bore on the first side of the primary piston unit wherein a variable chamber is defined between the primary piston unit and the emulator piston in the longitudinal bore, the emulator piston having a post extending toward the primary piston unit, the emulator piston being movable between an at-rest position and a plurality of apply positions while the primary piston unit remains substantially unmoved;

an elastomeric body positioned in the variable chamber wherein the elastomeric body is compressible between the emulator piston and the primary piston unit:

wherein the compensation port of the primary transverse bore is in open fluid communication with the variable chamber so that when the emulator piston is moved from the at-rest position while the primary piston unit and the secondary piston remain unmoved, fluid in the variable chamber between the primary piston unit and the emulator piston is forced to flow through the compensation port to the reservoir.

14. A master cylinder and brake pedal feel emulator according to claim 13 wherein the primary piston unit carries a seal that closes off the flow from the variable chamber to the reservoir by engaging the body within the stepped bore during a manual apply mode wherein the primary piston unit and the secondary piston are operable to generate a braking pressure.

\* \* \* \* \*